Oct. 3, 1950 A. H. DICKINSON 2,524,123

ELECTRONIC SYSTEM

Filed March 23, 1945 2 Sheets-Sheet 1

INVENTOR
A.H. DICKINSON
BY
W. McMahon
ATTORNEY

Oct. 3, 1950 A. H. DICKINSON 2,524,123

ELECTRONIC SYSTEM

Filed March 23, 1945 2 Sheets-Sheet 2

INVENTOR
A. H. DICKINSON
BY
ATTORNEY

Patented Oct. 3, 1950

2,524,123

UNITED STATES PATENT OFFICE 2,524,123

ELECTRONIC SYSTEM

Arthur H. Dickinson, Greenwich, Conn., assignor to International Business Machines Corporation, New York, N. Y., a corporation of New York Application March 23, 1945, Serial No. 584,463

7 Claims. (Cl. 250—27)

Figure 1:
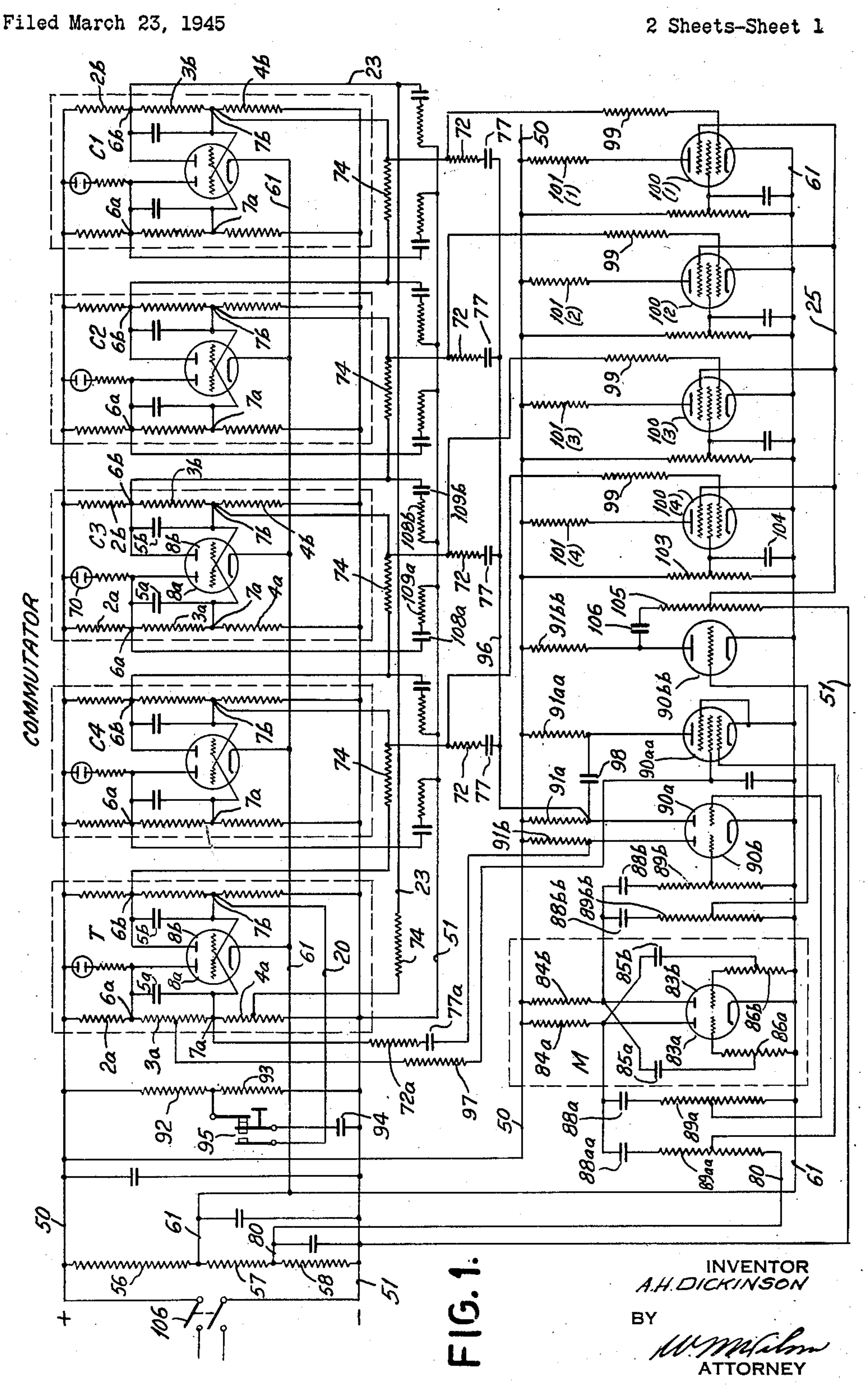

This invention relates to an electronic commutator or the like of general application and one special use of which has been disclosed in my copending application Serial No. 515,719, filed December 27, 1943, now U. S. Patent Number 2,514,035, dated July 4, 1950. The present application is directed to the commutator or the like per se.

An object of the invention is to provide a purely electronic commutator which performs a cycle and self-controls termination of its cycle.

An object of the invention is to provide a purely electronic commutator which advances through a series of different patterns of electrical conditions and self-controls its reset to a starting pattern.

An object of the invention is to provide a novel, purely electronic start-stop commutator.

An object of the invention is to provide a purely electronic start-stop commutator having solely conductive coupling between the commutator stages.

An object of the invention is to provide an electronic start-stop commutator whose rate of operation is determined by a succession of electrical impulses received from an external source.

An object of the invention is to provide an electronic start-stop commutator having stages arranged for sequential priming for operation by a succession of electrical pulses.

An object of the invention is to provide a start-stop electronic commutator including a control stage which controls the start and stop of the commutator cycle.

An object of the invention is to provide a start-stop electronic commutator composed of electronic trigger circuits.

An object of the invention is to provide an electronic start-stop commutator composed of such trigger circuits which include hard type triodes arranged for sequential priming for reversal and sequential reversal under control of a series of electrical pulses.

An object of the invention is to provide an electronic start-stop commutator which is self-adjusting from a chance arrangement of electrical conditions to a chosen arrangement.

Other objects of the invention will be pointed out in the following description and claims and illustrated in the accompanying drawings, which disclose, by way of examples, the principle of the invention and the best mode, which has been contemplated, of applying that principle.

Figure 2:
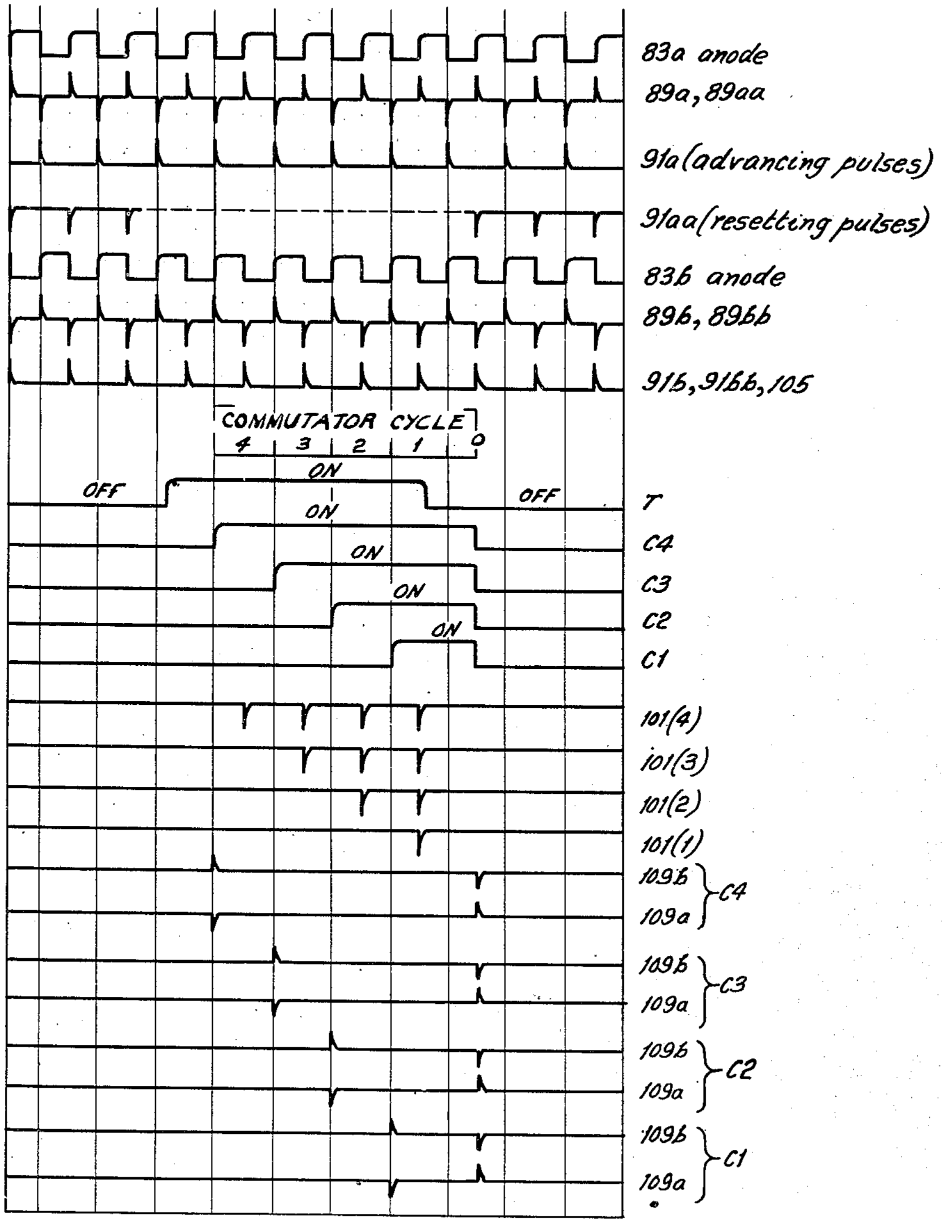

In the drawings:

Fig. 1 is a circuit diagram of the electrical system embodying my invention, and Fig. 2 shows the form and relative timing of electrical effects utilized in and generated by the operation of the electrical system.

*Oscillator and amplifiers*

Pulses are employed in this invention for operating the electronic commutator. Preferably, the source of such pulses is an oscillator whose output is amplified for these purposes. None of the circuits in this invention depend for their operation upon frequency or phase changes, but depend on the occurrence, per se, of pulses, so that locking or synchronizing means is unnecessary to maintain one portion of the circuit in step with another.

As will become clear later, the electronic commutator functions upon a cyclical basis. There is a definite relation between the duration of a cycle of the commutator and the base frequency of the oscillator, for the reason that the commutator is to be operated under control of pulses derived from the oscillator. A plurality of such pulses will be needed in a commutator cycle. The frequency of the oscillator, therefore, will be the number of pulses needed in a commutator cycle times the desired frequency of the commutator.

The oscillator employed herein is of the type commonly known as a multivibrator. Essentially, it is a two-stage, resistance coupled amplifier in which the output of the second stage is fed back to the input of the first stage. Such an oscillator produces square topped waves adapted for conversion into pulses of extremely sharp wave front and short duration. The circuit of the multivibrator and its principle of operation will now be briefly described.

Referring to Fig. 1, upon closure of line switch 106, a voltage is supplied to lines 50 and 51, and to lines 61 and 80 by means of a voltage divider comprising resistances 56, 57 and 58. The potentials of 61 and 80 are positive with respect to each other in the order given and with respect to line 51. The oscillator is shown within a dotted box and is designated M. It comprises vacuum tubes 83*a* and 83*b* and associated resistors and condensers. The anodes of the respective tubes connect to line 50 through resistances 84*a* and 84*b* and the common cathode connects to line 61.

Condensers 85*b* and 85*a* couple the anodes of tubes 83*a* and 83*b*, respectively, to the grids of 83*b* and 83*a*. Grid leak resistances 86*a* and 86*b* connect 85*a* and 85*b*, respectively, and also the grids of 83*a* and 83*b* to line 61 so that the normal bias of said tubes is zero. Such a circuit network is unstable and oscillations are initiated by incipient electrical disturbances. For example, an increase in current flow through 83*a* produces an increased voltage drop across resistor 84*a*, reducing the potential across 83*a*. This decrease is applied by condenser 85*b* to the grid of 83*b* increasing its bias. Current flow through 83*b* drops, decreasing the voltage drop across resistance 84*b*, increasing the potential across 83*b*. Condenser 85*a* feeds this increase to the grid of 83*a*, decreasing its bias and thus causing a rapid increase in current flow through 83*a*. Such action occurs with cumulative results and substantially instantaneously. Current flow through 83*a* is a maximum when tube 83*b* is at shutoff. When the circuit attains this condition, the charge on condenser 85*b* leaks off through resistor 86*b* and when such action is completed, tube 83*b* starts to conduct and the above described operation reverses. The frequency in cycles per second of this oscillatory circuit is approximately $$\frac{1}{f}=R_{86a}C_{85a}+R_{86b}C_{85b}$$

Thus, tubes 83*a* and 83*b* alternately pass heavy current, it being understood, that when one tube is conducting, the other is at cut-off, the situation reversing instantaneously. Such action produces square-topped waves of potential on the anodes of 83*a* and 83*b* (see Fig. 2), suitable for conversion into pulses having a steep wave-front and short duration. It will be noted that the voltages on the anode of 83*a* are 180 degrees out of phase with those on the anode of 83*b*. One cycle of oscillator operation is that period of time between corresponding points of two successive waves of voltage on the anode of either 83*a* or 83*b*.

A rise in anode potential of tube 83*a* charges condenser 88*a* and current flow occurs through resistor 89*a*. The product $R_{89a}$ $C_{88a}$ is relatively small, so that a positive pulse of extremely short duration and having a steep wave front is produced on resistor 89*a*. A drop in anode potential of tube 83*a* causes condenser 88*a* to discharge and a negative pulse of the type just noted is thereby produced on resistor 89*a*. In a similar manner, positive and negative pulses are produced on resistor 89*aa* which is coupled by condenser 88*aa* to the anode of tube 83*a*. The form and phase of the pulses produced on resistors 89*a* and 89*aa* are indicated in Fig. 2. Coupled by condensers 88*b* and 88*bb* to the anode of tube 83*b* are resistors 89*b* and 89*bb*. As is now clear, negative and positive pulses (see Fig. 2) are continually produced on resistances 89*b* and 89*bb* due to the fall and rise in anode potential of tube 83*b*. It is seen that the pulses on resistors 89*b* and 89*bb* are 180 degrees out of phase with the pulses on resistors 89*a* and 89*aa*. Certain of these pulses will be amplified and reversed in polarity prior to utilization in operating the electronic commutator.

The control grid of triode 90*a* is connected to resistor 89*a*. The control grid of pentode 90*aa* is connected to resistor 89*aa*. The anodes of 90*a* and 90*aa* are connected to line 50 by the respective resistors 91*a* and 91*aa*. Resistor 89*a* terminates at line 61, as does also the cathode of 90*a*. Accordingly, the normal bias of tube 90*a* is zero, it is normally fully conductive, and it is affected only by negative pulses on 89*a*. In response to these negative pulses, tube 90*a* produces on resistance 91*a* amplified positive pulses (see Fig. 2) which may serve as commutator advancing pulses. Resistor 89*aa* terminates at line 80 which is negative with respect to line 61, at which the cathode of pentode 90*aa* terminates. The potential between lines 61 and 80 is sufficient to maintain 90*aa* at cut-off for the screen for the screen voltage normally applied to 90*aa*. Tube 90*aa* is affected by positive pulses on 89*aa* only when the screen grid voltage is raised. Under this condition, tube 90*aa* converts the positive pulses received from 89*aa* into amplified negative pulses (see Fig. 2) on resistor 91*aa*. These negative pulses serve herein as commutator resetting pulses. The grids of triodes 90*b* and 90*bb* are connected, respectively, to resistors 89*b* and 89*bb*. The anodes of 90*b* and 90*bb* are connected to line 50 by the respective resistors 91*b* and 91*bb*. Resistors 89*b* and 89*bb* terminate at line 61, as do also the cathodes of 90*b* and 90*bb*. Hence, the normal bias of tubes 90*b* and 90*bb* is zero, and the tubes are affected only by negative pulses on 89*b* and 89*bb*, and produce amplified positive pulses (see Fig. 2) on resistors 91*b* and 91*bb*.

As seen in Fig. 2, the positive pulses on resistor 91*a* are 180 degrees out of phase with the negative pulses which may appear on resistor 91*aa* and with the positive pulses on resistors 91*b* and 91*bb*. These various pulses control operation of the electronic commutator.

*The electronic commutator*

This commutator includes five trigger circuits T, C4, C3, C2, and C1, the functions of which will be explained later. Each trigger circuit is shown in a dotted box. Since they are of the same construction, a full set of reference characters will be applied to only one of them, the trigger circuit C3.

*The trigger circuit.*—The trigger circuit has two impedance networks or branches, each including one of the vacuum tubes 8*a* and 8*b*. There is cross-coupling between the branches such that one branch is at low impedance when the other is at high impedance. The branches are symmetrical. Their corresponding elements have the same electrical values and are designated by the same number but distinguished by letters *a* and *b*. The tubes 8*a* and 8*b* are shown, for simplicity, as units of a duplex tube, but it is clear they may be entirely separate tubes. The units 8*a* and 8*b* are triodes of the type which is fully conductive when its grid bias is zero.

Each impedance branch includes resistors numbered 2, 3, and 4 in series between lines 50 and 51, a condenser numbered 5, shunting the middle resistor, and a triode numbered 8. The anode of the triode 8 is connected to point 6 at the junction of resistors 2 and 3 and the common cathode is connected to line 61, hereafter called the cathode line. The grid of 8*b* is connected to point 7*a*, at the junction of resistors 3*a* and 4*a*, while the grid of 8*a* is connected to corresponding point 7*b*. The two impedance branches thus are cross-coupled. An efficient value relation for the trigger circuit is one in which resistors 2 and 4 are each one-third the value of resistance 3 and in which condenser 5 is in the order of a few hundred micromicrofarads.

When point 7*b* is substantially at cathode potential, triode 8*a* is fully conductive; hence, a point 6*a* then is only slightly above cathode potential. Under this condition, point 7*a* is sufficiently negative to maintain the grid of 8*b* at cut-off. Point 66*b* is then at high potential and the drop across resistors 3b and 4b does not force the point 7b below cathode potential. These conditions define one state of stability of the circuit in which point 6a is at low potential, point 6b at high potential, triode 8a is fully conductive and triode 8b is non-conductive. This particular status of the circuit will be called the on status. The reverse status in which triode 8b is fully conductive and triode 8a is non-conductive and in which point 6a is at high potential while point 6b is at low potential is called the off status. A glow discharge tube 70 is connected by a suitable current limiting resistance to point 6a. In the on status of the trigger circuit, point 6a is at low potential, and sufficient potential difference exists between line 50 and point 6a to light the tube 70. But in the off status of the trigger circuit, point 6b is at high potential, and there is not sufficient potential difference between line 50 and point 6a to light the tube 70. Thus, when tube 70 is lit, it indicates the on status and when it is not lit, the off status of the trigger circuit is indicated.

To trip the trigger circuit from one status to the other, potential is impressed, from a source outside the circuit, on one or both of the impedance branches. Positive or negative potential may be applied to the same point of such circuit with reverse effects. The potential thus impressed may be in the form of a steep pulse of sufficient amplitude to trip the circuit without other aid. On the other hand, it may be desired to use a smaller potential pulse incapable by itself of tripping the circuit but effective only if a priming potential is also being applied to the same branch of the circuit to which the pulse is applied.

The tripping of a trigger circuit by a positive pulse of sufficient amplitude to be effective by itself will be considered first. Assume the trigger circuit T is in off status; i. e., tube 8b is fully conductive and tube 8a is non-conductive. Point 7b of circuit T is connected by a wire 20 to the normally open side of transfer contacts 95. The normally closed side of contacts 95 is connected to the junction of resistors 92 and 93 which are across lines 50 and 51. The central blade of contacts 95 is connected to one side of a condenser 94 which is connected at the opposite side to line 51. Contacts 95 are key-operated. In the normal, shown position, condenser 94 is charged to the potential existing across resistor 93. Upon the reversal of the contacts 95 by the operator, condenser 94 discharges a steep positive pulse, via wire 20, upon point 7b of trigger circuit T. This positive pulse is of sufficient amplitude to trip the circuit T unaided. The pulse increases the potential of point 7b and, hence, of the grid of triode 8a sufficiently to allow the triode 8a to start conducting, and current flows from line 50 through resistor 2a and triode 8a to cathode line 61. Consequently, point 6a drops suddenly in potential and a negative pulse is transferred by condenser 5a to the point 7a, effecting an abrupt increase in negative grid bias of triode 8b. Current flow through 8b ceases substantially instantaneously, whereby point 6b rises abruptly in potential. The resulting positive pulse is transferred by condenser 5b to point 7b, thereby promoting the decrease to zero of the grid bias of triode 8a, which decrease was initiated by application of the positive pulse from condenser 94 to the point 7b. The circuit T, at completion of this action, has switched from off to on status, in which its triode 8a is fully conductive and its triode 8b non-conductive, and in which point 6b is at high potential while point 6a is at low potential.

The tripping of a trigger circuit by the application of a negative pulse of sufficient amplitude will now be considered. Assume that trigger circuit C3 is in on status; i. e., triode 8a is fully conductive, triode 8b is non-conductive, and point 6b is at high potential while point 6a is at low potential. Point 7b of circuit C3 is connected via a resistor 72 and condenser 77 to a wire 96 to which, at the proper time, a negative (resetting) pulse (see Fig. 2) is fed, via a condenser 98, from resistor 91aa. This negative pulse is transmitted by a condenser 77 and a resistor 72 to point 7b of circuit C3, effecting a sudden increase in the negative grid bias of triode 8a. Current flow through 8a ceases substantially instantaneously, causing the point 6a to rise abruptly in potential. The resulting positive pulse is transferred by condenser 5a to point 7a and reduces the grid bias of triode 8b sufficiently to allow triode 8b to start conducting. Point 6b thereupon drops suddenly in potential and condenser 5b feeds the resulting negative pulse to point 7b, promoting the increase in negative grid bias of triode 8a which was initiated by the negative pulse fed via resistor 72 and condenser 77 to point 7b. The circuit C3, at completion of this action, is in off status, in which its triode 8a is non-conductive while triode 8b is fully conductive.

In the operation of the commutator, it is desired to trip the trigger circuits C4, C3, C2, and C1 sequentially. Positive (advancing) pulses (see Fig. 2) on resistor 91a are received by wire 96 and fed simultaneously to points 7b of the trigger circuits via parallel condenser-resistor pairs 77—72. In order that these pulses shall selectively operate the trigger circuits, they are held to a potential ineffective, when unaided, to trip a circuit, but effective only when supplemented by positive priming potential previously applied to the point 7b of one of the circuits. The circuits will be primed sequentially, whereby the pulses will be effective to trip the circuits sequentially. The circuits are so coupled that when T is on, it applies priming potential to point 7b of C4; when C4 is on, it applies priming potential to C3; when C3 is on, it applies priming potential to C2; and when C2 is on it applies priming potential to C1. For this purpose, point 6b of T is connected via a resistor 74 to point 7b. There is a similar connection between C4 and C3, between C3 and C2, and between C2 and C1. Initially, all the trigger circuits are in off status. When circuit C4 is in off status, its point 6b is at low potential and, in view of resistor 74, the potential at 6b has no appreciable effect on the potential at point 7b of C3. But when C4 is turned on, its point 6b is at high potential, and the result is to increase the potential at 7b of C3 to just below cathode potential. This increase in potential is called the priming potential. The next advancing pulse applied via a resistor 72 and condenser 77 to point 7b of C3 will then be effective to trip C3 to on status. The priming potential of itself or the pulse of itself is ineffective to trip the circuit. It requires the additive effect of full priming potential and of the full advancing pulse potential to trip the circuit. It is clear that a positive pulse of similar potential may be applied to the point 7a of a trigger circuit to be effective when supplemented by priming potential impressed on this point to trip the circuit from on to off state. This action is effected upon trigger circuit T during the commutator operation explained later.

The operation of the commutator as a whole will now be explained. The commutator provides means whereby electrical effects may be obtained at high rates of speed and without mechanical inertia. It comprises a number of stages dependent on the number of steps through which it is to progress in a cycle and also includes a control element. The stages here are composed of the trigger circuits with the general designation C and the control element comprises the trigger circuit T. The C elements or trigger circuits may be called the stepping elements of the commutator. As illustrative, four C, stepping elements are shown to provide for four progressive steps in a cycle. The element T is a control element in the commutator. Element T must be turned on to start the commutator cycle, and it controls the turning off of all the elements, to terminate the cycle. The stepping elements, C4, C3, C2, and C1 operate sequentially during the cycle.

As illustrative, manual means comprising the key contacts 95 are employed to turn on T and initiate a commutator cycle. Upon shifting of the contacts 95, condenser 94 discharges a steep positive pulse upon point 7*b* of T, turning it on (see Fig. 2) in the manner explained before.

When T is on, its point 6*b* is at high potential and is applying priming potential, via coupling resistor 74, to point 7*b* of stage C4. The next advancing pulse (see Fig. 2) which follows the turning on of T is effective to turn on stage C4 (see Fig. 2). This occurrence may be taken as the beginning of a commutator cycle. With C4 on, its point 6*b* is at high potential, applying priming potential via coupling resistor 74 to point 7*b* of the next stage, C3. Hence, the following advancing pulse turns on stage C3 (see Fig. 2) one oscillator cycle interval after C4 was switched on. Similarly, C3 primes C2 to be turned on one oscillator cycle interval later by another advancing pulse, and C2 when turned on primes C1 to be turned on, after a similar interval, by a succeeding advancing pulse.

Point 6*b* of C1 is connected by a wire 23 and resistor 74 to a point on resistor 4*a* of T. With C1 now in its on status, point 6*b* is at high potential and is applying priming potential, via the wire 23, the connected resistor 74, and a portion of resistor 4*a* of T to the point 7*a* of T. As previously described, positive pulses (see Fig. 2) are continually produced on resistor 91*b* which are 180 degrees out of phase with the advancing pulses, which appear on resistor 91*a*. Thus, an advancing pulse turns on C1 which primes point 7*a* of T. Half an oscillator cycle later, a positive pulse on resistor 91*b* is transmitted by a condenser 71*a* and resistor 72*a* to point 7*a* of T, tripping T from its on to its off status, in a manner now understood.

The midpoint of resistor 3*a* of circuit T is connected via a current limiting resistor 97 to the screen grid of pentode 90*aa*. The control grid of 90*aa* continually receives positive pulses (see Fig. 2) from resistor 89*aa*, as previously described. These positive pulses are ineffective to increase current flow in 90*aa* while the screen grid remains at low potential. But when the screen grid is raised in potential, the positive pulses are effective to increase current flow in 90*aa*, which converts the positive pulses to negative (resetting) pulses (see Fig. 2) on the resistor 91*aa*. When element T is turned off, as just described, its point 6*a* is at high potential and the midpoint of resistor 3*a* also is at increased potential, whereby the connected screen grid of 90*aa* is raised in potential. A positive pulse appears on resistor 89*aa* at the same time as element T is turned off. The positive pulse is declining in potential while point 6*a* and the connected screen grid of 90*aa* are rising in potential. Hence, the positive pulse on resistor 89*aa* which occurs coincidentally with the turning off of T is not effective. The next such positive pulse on 89*aa* is effective, however, causing a negative (resetting) pulse to appear on resistor 91*aa*, as indicated in Fig. 2. This negative pulse is transmitted via the condenser 98 to line 96 and feeds thence via the parallel condenser-resistor pairs 71—72 to points 7*b* of elements C4, C3, C2, and C1 simultaneously. The negative (resetting) pulse is of sufficient amplitude to turn off all these elements simultaneously in the manner described before. The point at which the elements C turn off defines the end of the cycle.

The commutator cycle may be considered as beginning with the turning on of the first stage C4. This point also defines the beginning of the index interval 4. The point at which the next stage C3 turns on defines the beginning of index interval 3, the point at which C2 turns on defines the start of index interval 2, and the point at which C1 turns on defines the beginning of index interval 1. The cycle terminates, at the point designated O in Fig. 2, with the turning off of all the C elements simultaneously, which occurs half a cycle point interval after the end of the 1 index point interval.

It is seen that the commutator elements are switched on sequentially. Element T is first turned on to bring about the automatic performance of a commutator cycle. After element T is turned on, elements C4, C3, C2, and C1 are turned on automatically and sequentially at index intervals apart, each such interval being determined by the oscillator cycle. When C1 is turned on, it conditions T to be turned off. Element T is then automatically turned off. When T is off, it enables means to operate for turning off all the C elements simultaneously, terminating the cycle.

It is to be noted that C4 is on for four full increments (index intervals) of the cycle, C3 is on for three full increments, C2 for two full increments, and C1 for one full increment. The C elements are thus turned on at differential times of a cycle and stay on for differential positions of the cycle.

In the disclosed embodiment, before a second cycle of the commutator may be initiated, the contacts 95 must first be returned to the normal, shown position to allow the condenser 94 to be recharged. It is appreciated, therefore, that the commutator elements progress through their sequential operations only once for each shift of the contacts 95 from and back to the normal position.

Attention is called to the fact that although an advancing pulse is applied to all the C elements simultaneously, it functions to turn on only that C element which has been fully primed. The same pulse will be ineffective to turn on more than one C element. Assume, for example, that full priming potential has been applied to point 7*b* of element C3. The next advancing pulse turns on C3. As C3 turns on, its point 6*b* rises in potential as does also the potential of the resistance-coupled point 7*b* of C2. The rise in potential is not instantaneous but is exponential. By the time that the element C3 has been fully turned on and is applying full priming potential to point 7b of C2, the advancing pulse which turned on C3 has passed its peak and is ineffective to turn on C2. Thus, each advancing pulse will operate only one element (stage) of the commutator.

The sequential operation of elements C4, C3, C2, and C1 during a commutator cycle produces higher potentials at points 6b and 7b and lower potentials at points 6a and 7a for varying proportions of the cycle. These electrical effects may be used to control other parts of the commutator to produce groups of pulses or to control circuits external to the commutator to produce groups of pulses.

The control by the commutator of illustrative circuits external to the commutator will be explained first. The points 7b of the C elements are similarly coupled by resistors 99 to the control grids of pentodes 100 (4), 100 (3), 100 (2), and 100 (1). The screen grids of these pentodes are maintained at constant potential by connection to voltage dividers 103 and condensers 104 shunting portions of the voltage dividers. The suppressor grids of the pentodes are connected to a common wire 25 which taps a resistor 105. The resistor 105 is coupled by a condenser 106 to the anode of triode 90bb. As explained previously, positive pulses are continually produced on the anode resistor 91bb of triode 90bb. Hence, such pulses also appear continually on resistor 105 and are transmitted by wire 25 simultaneously to the suppressor grids of the pentodes 100. Since resistor 105 terminates at line 51 which is below cathode potential, the suppressor grids of tubes 100 in the intervals between the positive pulses received from resistor 105, are sufficiently negative to maintain the tubes at cut-off regardless of the control grid potential. The positive pulses received from resistor 105 intermittently increase the suppressor potentials of the tubes 100 but the tubes still remain at cut-off if the control grid potential is not raised. The control grid potential of each tube 100 is determined by the potential of the connected point 7b of a C element of the commutator. When the C element is off, its point 7b is below cathode potential; hence, the connected control grid of the tube 100 is at negative bias, sufficient to maintain the tube at cut-off even with the suppressor grid at increased potential. When the C element is turned on, its point 7b is increased substantially to cathode potential. Accordingly, the connected control grid of the associated tube 100 is brought to zero bias. Under this condition, a positive pulse received by the suppressor grid of the tube from resistor 105 is effective to cause the tube to conduct current. Consequently, there is a sudden increase in potential drop across the anode resistor 101 of the tube 100, whereby a negative pulse may be taken off a suitable, chosen point of the anode resistor for control purposes which do not enter into the present invention.

During a commutator cycle, element C4 is on for four full index intervals during which four positive pulses appear on resistor 105; hence, four negative pulses will be produced on resistor 101 (4) during a commutator cycle (see Fig. 2). During this cycle, C3 is on for an interval in which three pulses appear on resistor 105, hence; three negative pulses appear on resistor 101 (3). Similarly, under control of C2 and C1, and pulses on resistor 105, two negative pulses and one negative pulse appear, during a commutator cycle, on resistors 101 (2) and 101 (1), respectively.

It may be noted that a positive pulse appears on resistor 105 just as all the elements C are turning off. The potentials of points 7b of the C elements are dropping rapidly at this time, so that the positive pulse then appearing on resistor 105 is not converted by tubes 100 into negative pulses.

The foregoing has described illustrative means controlled by the electronic commutator to produce distinct trains or groups of pulses, each group containing a number of pulses proportional to the duration of a commutator cycle for which the related stepping element or stage C of the commutator is in on status.

The commutator may also function to control the generation of single pulses at different times of a cycle. Fig. 2 indicates that the C elements of the commutator produce voltage waves which are substantially square-topped in character. Furthermore, when point 6b of a C element is at high potential, point 6a of the element is at low potential, and vice versa. It is further understood that both these points reach a new and sustained potential level very rapidly when the element is tripped to a reverse status. The voltage changes at points of the element, when it is being triggered, may be employed to produce sharp pulses having a steep wave front. Illustrative means for carrying out this purpose are shown to comprise condenser-resistor pairs connecting points of both impedance branches of each C element to the line 51. One of these condenser-resistor pairs comprises condenser 108a and resistor 109a connected to point 6a of a C element and the other pair comprises condenser 108b and resistor 109b connected to point 6b of the element. If the RC product of each condenser-resistor pair is sufficiently small, a change in potential of the connected point 6 causes a sharp impulse to appear on resistor 109. Thus, a sharp positive pulse will be produced on the resistor 109 upon the connected point 6 rising in potential, and a sharp negative pulse will be produced on the resistor upon a drop in potential of the connected point 6. The rise in potential of point 6b of a C element occurs as the C element is being tripped to on state, whereby a positive pulse is produced on related resistor 109b. At the same time, point 6a of the same element is dropping in potential, whereby a negative pulse is simultaneously produced on resistor 109a. Element C4 is tripped to on status at the beginning of the 4 index interval, element C3 at the start of the 3 index interval, element C2 at the start of the 2 index interval, and element C1 at the start of the 1 index interval. Accordingly, positive pulses appear on resistors 109b of the several C elements and negative pulses appear on resistors 109a at these times of the commutator cycle, as indicated in Fig. 2. All the C elements turn off simultaneously at the end of the commutator cycle, denoted by O. When a C element turns off, its point 6b drops in potential simultaneously with a rise in potential of its point 6a. Accordingly, a negative pulse appears on each resistor 109b and a positive pulse on each resistor 109a at the end of the commutator cycle. The resistors 109a and 109b may be tapped for pulses to control operations which do not enter into the present invention.

In describing the operation of the commutator, it was assumed that the elements T and C were all initially in their off status. The nature of a trigger circuit element of the kind described is such that upon the instant of closure of the line switch 106, the element may haphazardly assume either an on or an off status. Nevertheless, the elements are so interconnected that the commutator is self-conditioning to a normal, off status. That is, regardless of the status assumed by the various elements of the commutator upon the closure of line switch 106, the commutator adjusts itself to the normal off status.

Assume, for instance, that upon the closure of line switch 106, elements T, C4, and C2 assume off states and elements C3 and C1 assume on states. Point 6a of T is then at high potential, under which condition the circuit path from the midpoint of resistor 3a of T and including resistor 97, impresses high potential on the screen grid of pentode 90aa. Accordingly, the positive pulses received by the control grid of 90aa from resistor 89aa are effective to cause 90aa to feed negative, resetting pulses to wire 96. The first such negative pulse on wire 96 is transmitted to points 7b of all the C elements, turning off any of them which have been in off status, as previously explained. Hence, elements C3 and C1 will be tripped to off status. All the elements T and C of the commutator will then be in off status, and the commutator is ready to function, in its normal manner, to perform commutator cycles.

As another example, assume that upon the closure of line switch 106, elements T and C2 assume on states while the remaining elements assume off states. With C2 in on state, its point 6b is at high potential, serving through the coupling resistor 74 to apply priming potential to point 7b of C1. Hence, the first advancing pulse received by wire 96 from resistor 91a and transmitted via the condenser-resistor pairs 77—72 to point 7b of primed element C1 is effective to turn it on, in the manner previously described. With C1 now on, its point 6b is at high potential, and through wire 23 and connected condenser 74, priming potential is applied to point 7a of element T. The next positive pulse produced on resistor 91b is transmitted via a condenser 77a and a resistor 72a to point 7a of T, turning off T, in the manner described before. With T now off, the screen potential of pentode 90a is high, and the positive pulses fed from resistor 89aa to the control grid of 90aa are converted into resetting pulses which are transmitted via condenser 98 to line 96. The first resetting pulse is effective to turn off all the C elements, as explained before. The elements T and C are then all in normal, off status, ready to perform a regulator commutator cycle.

Since there are five elements in the illustrative commutator, there are thirty two different chance arrangements which may be assumed by the commutator when switch 106 is first turned on. Two of these arrangements have been discussed, and it has been shown that the commutator adjusts itself automatically from each of these two arrangements to the normal status. It can be shown similarly that by reason of the nature of the connections between the elements of the commutator, it will adjust itself from any one of the other thirty possible arrangements to the normal arrangement, in which all the elements are in off status.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination, an electronic start-stop commutator including an electronic trigger circuit to serve as a control stage and a series of electronic trigger circuits to serve as stepping stages, means coupling the stepping stages in cascade for reversal in status in sequential manner, means to reverse the status of the control stage, means rendered effective thereupon to sequentially reverse the status of the stepping stages, means controlled by reversal of the last stepping stage for returning the control stage to its original status, and means thereupon rendered effective by the control stage for returning the stepping stages to their original status.

2. In combination, an electrical network including a series of electronic trigger circuits, each having an initial stable status, means interconnecting the circuits into a closed ring so that each controls the next and the last controls the first, means energizing the network to effect sequential reversal of the circuits to their alternative stable status, the last upon reversal in status enabling the first to be returned to its initial status, and means controlled by the first circuit upon its return to its initial status for concurrently returning the remaining circuits to their initial status.

3. An electronic commutator including a series of electronic trigger devices coupled in cascade for sequential operation to a sustained stable status, means operating the series of devices sequentially during a commutator cycle to said status, whereby each device is in said status for a different proportion of the cycle duration, and a pulse producer coupled to an associated one of the trigger devices so as to be rendered effective thereby to produce a number of pulses dependent on the proportion of the cycle duration for which the associated device is in said status.

4. An electronic commutator including a series of electronic trigger devices coupled in cascade for sequential operation to a sustained stable status, means operating the series of devices sequentially during a commutator cycle to said status, whereby each device is in said status for a differential time of the cycle, and pulse producing means including a series of electronic pulse gates, and means placing each pulse gate under control of an associated one of the trigger devices to be rendered operative by the associated device while in said status, whereby the pulse gates are operative to pass pulses for differential times of the cycle corresponding to the differential times for which the associated devices are in said status.

5. In combination, an electronic commutator comprising a series of double stability electronic triggers of which each includes a pair of electronic valves cross-coupled so that a first conducts and the other is at relative cut-off in a stable reset state of the trigger, and vice versa in a stable reverse state of the trigger, a circuit supplying successive pulses to the series of triggers, means coupling the triggers in cascade for sequential response to said pulses, each trigger in sequence being operated by a pulse to shift current flow from its first valve to the other so as to assume the reverse stable state, a pulse-producing circuit operable to supply a common restoring pulse simultaneously to the triggers to shift current flow back to the first valve in each trigger and thereby to return each trigger to its reset state, and circuits automatically brought into effect by the last trigger in the series upon its being actuated to the reverse state for rendering the pulse-producing circuit operative to supply the restoring pulse to the triggers to effect their concurrent restoration to the original reset status.

6. In combination, an electronic commutator comprising a series of double stability electronic triggers of which each has a pair of electron valves cross-coupled so that a first valve conducts and the other is at relative cut-off in a stable reset state of the trigger, and vice versa in a stable reverse state of the trigger, a circuit supplying successive pulses each simultaneously to all said triggers, means coupling the triggers in cascade so that each when in reverse state primes the next for response to the next pulse to shift current flow from the first to the other valve and thereby to assume the reverse state, a pulse-producing circuit operable to supp'y a common restoring pulse to all said triggers to shift current flow in each trigger back to the first valve and thereby to restore each trigger to its reset state, the restoring pulse being of adequate potential to restore each trigger unassisted by priming of the triggers for such action, and circuits automatically brought into effect by the last trigger in the series upon its sequential actuation to the reverse state for rendering said pulse-producing circuit operative to supply the restoring pulse to effect the concurrent return of the triggers to reset state.

7. In combination, an electronic commutator comprising a series of stepping, electronic triggers cascade-coupled for sequential reversal in status by successive stepping pulses after conditioning of the series of stepping triggers for response to these pulses, means supplying said pulses to the series of stepping triggers, a controlling, electronic trigger of the double stability type having a pair of space current valves cross-coupled so that a first conducts and the other is at relative cut-off in a stable reset status of the controlling trigger, and vice versa in a stable reverse state of the controlling trigger, a circuit for shifting current flow in the controlling trigger from its first valve to the other and thereby to actuate the controlling trigger to its reverse state, a circuit operated by the controlling trigger upon its actuation to the reverse state for conditioning the series of stepping triggers to respond to and be sequentially reversed by said pulses, a circuit controlled by the last stepping trigger in the series upon its reversal for shifting current flow back to the first valve in the controlling trigger and thereby restoring the controlling trigger to its reset status, and a normally idle pulse-producing circuit rendered active by the controlling trigger upon return to reset status for producing and supplying a restoring pulse simultaneously to the stepping triggers to effect their concurrent restoration to control status.

ARTHUR H. DICKINSON.

REFERENCES CITED

The following references are of record in the file of this patent:

UNITED STATES PATENTS

| Number | Name | Date |
|---|---|---|
| 1,918,252 | Dunham | July 18, 1933 |
| 2,272,070 | Reeves | Feb. 3, 1942 |
| 2,303,016 | Blount | Nov. 24, 1942 |
| 2,306,386 | Hollywood | Dec. 29, 1942 |
| 2,324,314 | Michel | July 13, 1943 |
| 2,342,753 | Pearson et al. | Feb. 29, 1944 |
| 2,373,134 | Massonneau | Apr. 10, 1945 |
| 2,404,918 | Overbeck | July 30, 1946 |

FOREIGN PATENTS

| Number | Country | Date |
|---|---|---|
| 355,705 | Great Britain | Aug. 24, 1931 |

OTHER REFERENCES

Journal of Scientific Instruments, vol. 15, 1938, "A Thyratron Counter," by Uffelmann, pp. 222-226.